United States Patent
Stafford

(10) Patent No.: US 7,100,753 B1
(45) Date of Patent: Sep. 5, 2006

(54) TORQUE CONVERTER CLUTCH APPLY VALVE

(75) Inventor: Maura Jane Stafford, Warner Robins, GA (US)

(73) Assignee: Sonnax Industries, Inc., Bellows Falls, VT (US)

(*) Notice: Subject to any disclaimer, the term of this patent is extended or adjusted under 35 U.S.C. 154(b) by 189 days.

(21) Appl. No.: 10/899,798

(22) Filed: Jul. 26, 2004

Related U.S. Application Data

(60) Provisional application No. 60/490,242, filed on Jul. 25, 2003.

(51) Int. Cl.
*F16D 33/18* (2006.01)

(52) U.S. Cl. .................... 192/3.3; 192/85 AA

(58) Field of Classification Search ............... 192/3.28, 192/3.29, 3.3, 85 R, 85 AA; 137/248, 384; 251/214, 332; 277/401, 434, 449, 457, 460, 277/467, 512, 558, 581, 605, 927; 29/401.1, 29/402.01, 402.02
See application file for complete search history.

(56) References Cited

U.S. PATENT DOCUMENTS

| | | | | |
|---|---|---|---|---|
| 2,180,347 A | * | 11/1939 | Bohuslav | ................. 123/188.1 |
| 2,749,195 A | * | 6/1956 | Kruger | ........................ 92/183 |
| 3,085,515 A | * | 4/1963 | Workman | ................... 417/511 |
| 3,303,658 A | * | 2/1967 | Chellis | ............................ 62/6 |
| 4,403,922 A | * | 9/1983 | Roeder | ........................ 417/358 |
| 4,474,106 A | * | 10/1984 | Durenec | ...................... 92/159 |
| 4,840,379 A | * | 6/1989 | Thoman, Jr. | ................ 277/584 |
| 4,844,481 A | * | 7/1989 | Marchadour | ................ 277/470 |
| 4,878,519 A | * | 11/1989 | Berding et al. | ............... 138/31 |
| 5,131,666 A | * | 7/1992 | Hutchens | ..................... 277/523 |
| 5,964,378 A | * | 10/1999 | Sperry et al. | ............ 222/145.2 |
| 6,736,747 B1 | | 5/2004 | Stafford | |
| 6,832,671 B1 | | 12/2004 | Stafford | |

* cited by examiner

*Primary Examiner*—Saul Rodriguez
(74) *Attorney, Agent, or Firm*—Clifford F. Rey

(57) ABSTRACT

A replacement torque converter clutch (TCC) apply valve for regulating the application of the torque converter clutch within an automatic transmission. The present TCC apply valve includes a valve piston having an expandable seal located at the primary wear location within the valve body to reduce hydraulic leakage. The valve piston also includes an internal fluid gallery formed therein in fluid communication with an annular groove wherein the expandable seal resides. Whenever the present TCC apply valve is actuated, TCC signal pressure enters the fluid gallery in the valve piston under pressure and urges the expandable seal in a radially outward direction into contact with the mating bore to minimize hydraulic fluid leakage during the apply cycle of the torque converter clutch. The valve piston also includes a control land having a substantially increased axial length with annular lubrication grooves, which improves stability and accuracy in operation.

18 Claims, 5 Drawing Sheets

TORQUE CONVERTER CLUTCH APPLY VALVE

CROSS-REFERENCE TO RELATED APPLICATION

This application claims the benefit under 35 U.S.C. 119(e) of U.S. Provisional Patent Application No. 60/490,242 filed Jul. 25, 2003 entitled Torque Converter Clutch Apply Valve.

BACKGROUND OF INVENTION

The present invention relates generally to the field of hydraulic circuits within an automatic transmission of a land vehicle and, more particularly, to a Torque Converter Clutch (hereinafter "TCC") Apply Valve for GENERAL MOTORS 4T65-E and other similar transmissions that directs torque converter fluid pressure to the TCC apply and release circuits to actuate the torque converter clutch.

Automatic transmission systems of the prior art have a hydraulic circuit sub-system which includes at least a hydraulic pump, a valve body having fluid conducting passageways or circuits, input and exhaust ports formed within the fluid circuits, and a plurality of "spool" valves so-called because of their resemblance to sewing thread spools. Such spool valves are comprised of modified, cylindrical pistons which alternately open and close fluid ports within the valve body to regulate the flow and pressure of automatic transmission fluid (hereinafter "ATF") within the fluid circuits to actuate various components of the transmission. It will be understood that in describing hydraulic fluid circuits, ATF usually changes names when it passes through an orifice or control valve in a specific circuit.

ATF leakage within the TCC apply and release circuits occurs due to the constant oscillation and abrasive action of the TCC apply valve within the mating bore of the aluminum valve body, which results in a loss of converter apply pressure. The loss of pressure in the apply circuit causes TCC slippage, converter shudder, and eventually an overheated and/or burned torque converter. Thus, the present invention has been developed to resolve these problems and other shortcomings of the prior art.

There are known prior art patents and a pending patent application that are available in the field of hydraulic control valves. One example of a torque converter clutch (TCC) apply valve is disclosed in pending U.S. patent application Ser. No. 10/187,092 to Stafford (currently on appeal) which discloses a TCC apply valve including an apply piston having an expandable seal installed thereon at the primary wear location within the valve body to reduce ATF leakage. This valve piston also includes an internal ATF gallery with radially extending passages formed therein in fluid communication with an annular groove wherein the expandable seal resides. Whenever the present TCC Apply Valve is actuated by the TCC solenoid, TCC signal pressure forces ATF into the gallery in the apply valve piston and further urges the seal radially outward into contact with the bore to minimize ATF leakage during the apply cycle of the torque converter clutch.

Another example of a hydraulic valve having a structural feature in common with the present invention is disclosed in U.S. Pat. No. 6,736,747 to Stafford which teaches a forward clutch control valve assembly for a Ford AX4N transaxle including a primary control land having an increased outside diameter and axial length, which replaces the narrow forward stem of the original equipment valve piston. The increased axial length of the primary control land on this valve piston is based on the limits of axial travel of the piston within the cylindrical bore wherein the valve piston resides during operation. This forward clutch control valve assembly also provides a substantially increased control land-to-bore surface contact ratio and an increased end face surface area. As a result this present forward clutch control valve assembly is substantially less prone to bending and/or seizure within its mating bore during operation.

While these devices fulfill their respective, particular objectives and requirements, the aforementioned patents do not disclose the Torque Converter Clutch Apply Valve of the present invention, which substantially departs from the conventional concepts and designs of the prior art.

SUMMARY OF THE INVENTION

Accordingly, the present invention provides a replacement TCC Apply Valve including an apply valve piston having an expandable seal fabricated from polytetrafluoroethylene (hereinafter "PTFE") i.e. TEFLON or other similar material installed thereon at the primary wear location within the valve body to reduce ATF leakage. The expandable seal is actuated by an internal ATF gallery comprised of radially extending passages formed therein in fluid communication with an annular groove wherein the expandable seal resides. Whenever the present TCC Apply Valve is activated by the TCC solenoid, TCC signal pressure forces ATF into the fluid gallery in the apply valve piston and urges the seal radially outward into contact with the bore to minimize ATF leakage during the apply cycle of the torque converter clutch.

In addition, the present TCC Apply Valve includes a secondary control land having a substantially increased axial length, which replaces the narrow forward stem of the original equipment TCC apply valve piston improving stability and accuracy in operation. The increased axial length of the secondary control land is based on the limits of axial travel of the piston within the cylindrical bore.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Those skilled in the art will appreciate that the conception upon which this disclosure is based may readily be utilized as a basis for the designing of other structures, methods, and systems for carrying out the purposes of the present invention. It is important, therefore, that the claims be regarded as including such equivalent constructions insofar as they do not depart from the spirit and scope of the present invention.

BRIEF DESCRIPTION OF THE DRAWINGS

The novel features of the present invention are set forth in the appended claim. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENT

Figure 1:
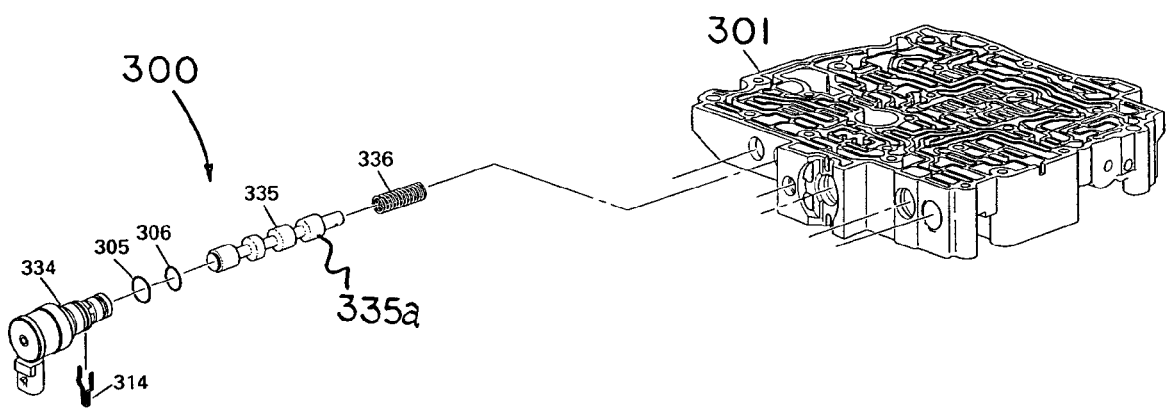
FIG. 1 is an exploded perspective view of a prior art TCC Apply Valve shown with the valve body of the GENERAL MOTORS 4T65E transmission.

Prior to disclosing the present invention in detail it may be beneficial to briefly review the structure and function of a torque converter clutch (hereinafter "TCC") apply valve of the prior art for purposes of comparison. With further reference to the drawings there is shown therein a TCC apply valve of the prior art, indicated generally at 300, and illustrated in FIG. 1. The prior art the TCC apply valve 300 is a spool-type valve comprising an elongated, cylindrical piston 335 having a plurality of control lands and a compression spring 336.

The TCC apply valve 300 operates in conjunction with the TCC solenoid 334, which includes O-ring seals 305, 306 and a retaining clip 314. The TCC solenoid 334 is an ON/OFF type solenoid that receives its voltage supply through the ignition switch when the Power Control Module (PCM) on the vehicle provides the ground. When the TCC solenoid 334 is de-energized or OFF, TCC signal fluid is exhausted through the solenoid. When the TCC solenoid 334 is energized or ON, its exhaust port closes allowing TCC signal circuit pressure to move the TCC regulator apply valve 300 against spring force and line pressure.

Figure 2A:
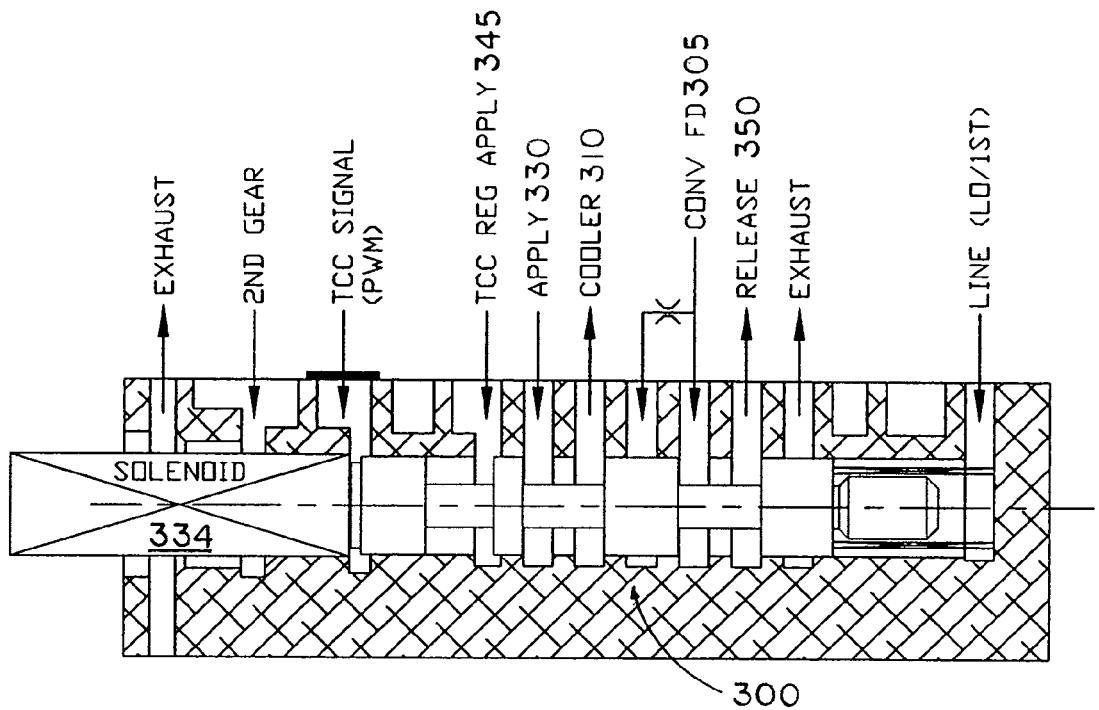
FIG. 2A is a cross-sectional view of the prior art TCC apply valve of FIG. 1 shown within the valve body of the GENERAL MOTORS 4T65E transmission illustrating the TCC Apply Valve in a released or OFF position.
Figure 2B:
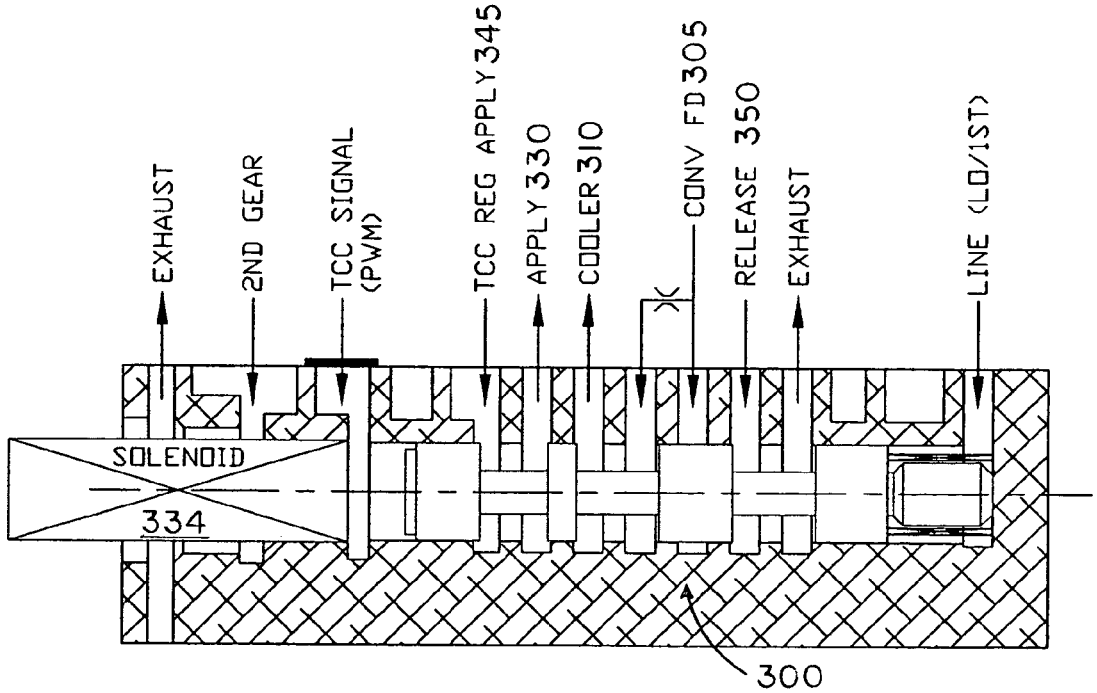
FIG. 2B is a cross-sectional view of the prior art TCC apply valve of FIG. 1 shown within the valve body of the GENERAL MOTORS 4T65E transmission illustrating the TCC Apply Valve in an applied or ON position.

More particularly, when the TCC solenoid 334 is OFF, the TCC apply valve 300 is held in the position shown in FIG. 2A by spring force and line pressure. In this position converter feed pressure at 305 enters the torque converter clutch release circuit at 350 and apply fluid as at 330 flows around the valve and into the cooler circuit at 310. With the TCC solenoid 334 ON, TCC signal fluid moves the valve against line pressure and spring force. When actuated (i.e. stroked to the right in FIG. 2B), it directs regulated line pressure at 345 into the apply circuit at 330.

Leakage can eventually develop within the TCC apply circuit 330 as the result of mechanical wear and the 4T60E transmission may exhibit torque converter shudder, a burned torque converter, clutch failure and/or related diagnostic codes. Often such problems are caused by the abrasive action of the original equipment manufacture (hereinafter "OEM") TCC apply valve 300, which is fabricated from unanodized aluminum wearing against the aluminum valve body 301. The result is loss of hydraulic pressure within the TCC apply circuit requiring costly replacement of the valve body 301.

Figure 3A:
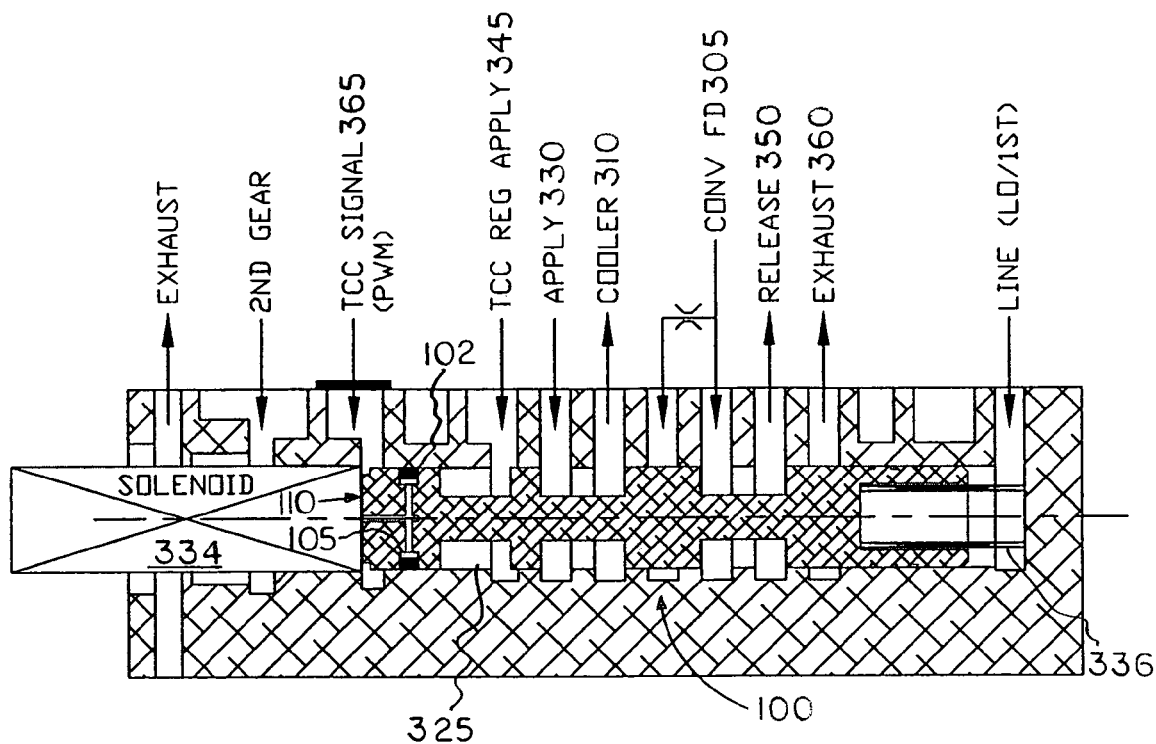
FIG. 3A is a cross-sectional view of the present TCC apply valve shown within the valve body of the GENERAL MOTORS 4T65E transmission illustrating the TCC Apply Valve in a released or OFF position.
Figure 3B:
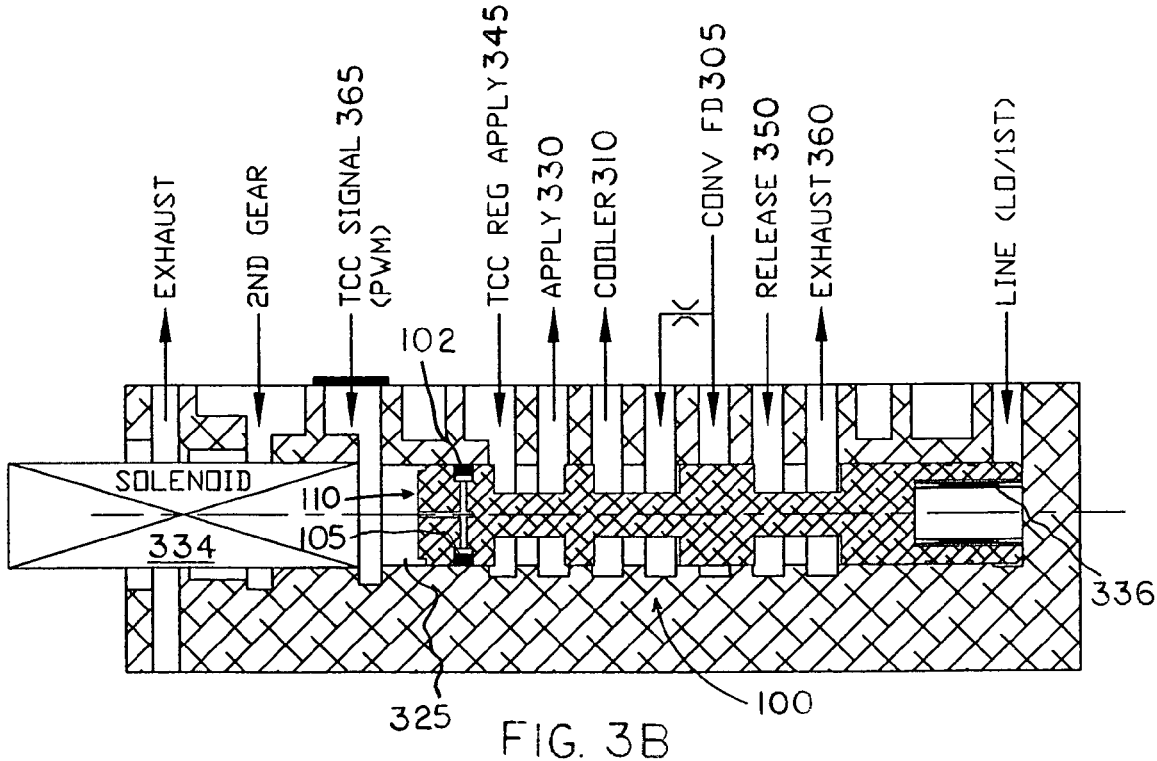
FIG. 3B is a cross-sectional view of the present TCC apply valve shown within the valve body of the GENERAL MOTORS 4T65E transmission illustrating the TCC Apply Valve in an applied or ON position.

Accordingly, the replacement TCC Apply Valve of the present invention provides a solution to this problem and will now be described. Referring to FIGS. 3A and 3B there is shown therein a replacement TCC Apply Valve assembly in accordance with the present invention, indicated generally at 100. The present TCC Apply Valve assembly 100 includes a valve piston, indicated generally at 110, having an expandable (PTFE) i.e. TEFLON seal 102 or other similar seal, which is disposed in the principal wear location within the bore 325 to prevent ATF leakage. The seal 102 may include an optional expander spring 105 disposed in concentric relation and residing to the interior of the seal.

Figure 4:
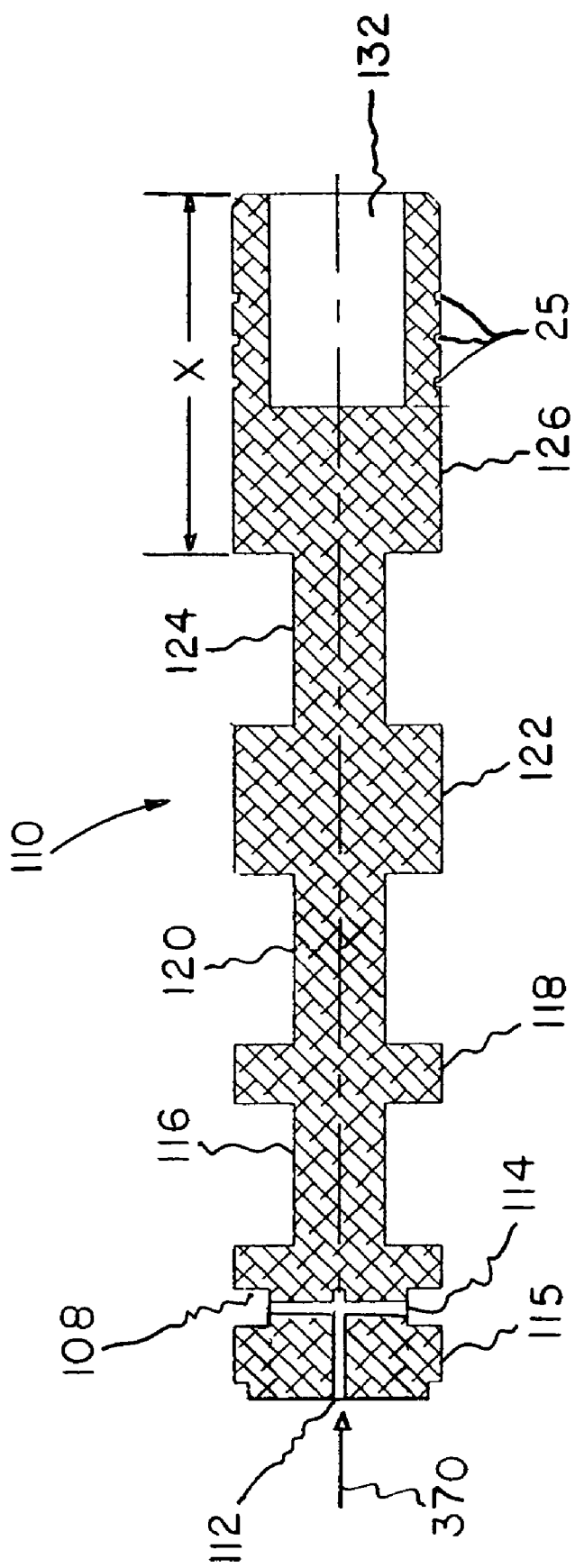
FIG. 4 is a longitudinal cross-section of the present TCC apply valve piston.
Figure 5A:
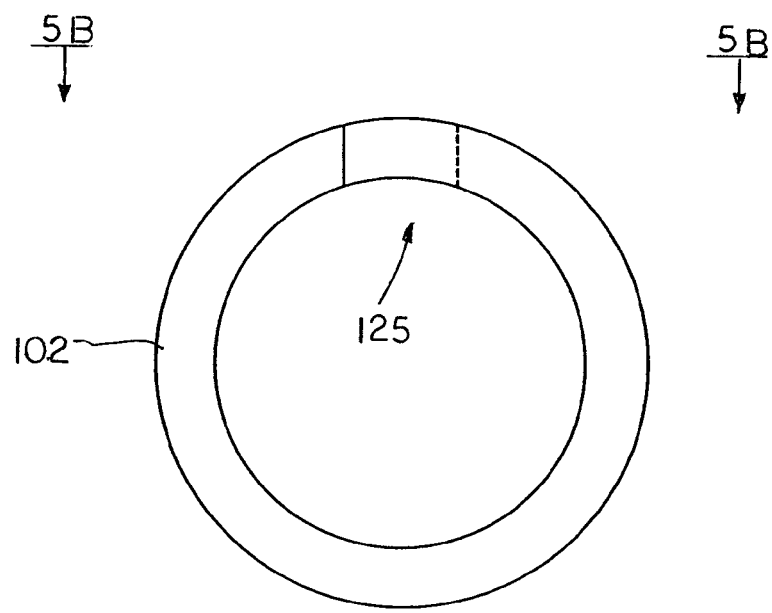
FIG. 5A is an enlarged side view of the expandable seal illustrating the scarf cut.
Figure 5B:
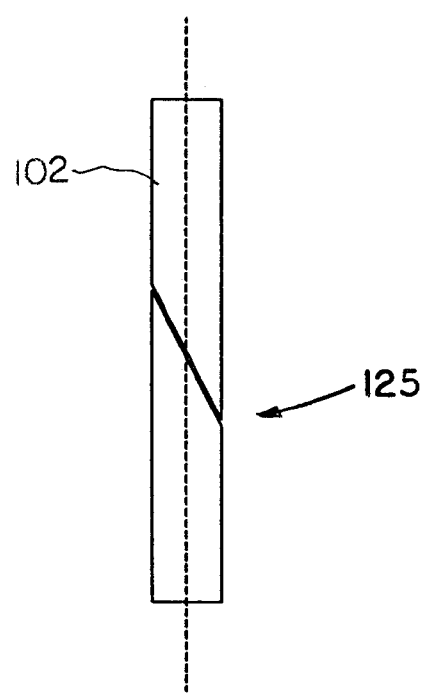
FIG. 5B is a plan view taken along the section line 5B—5B of FIG. 5A illustrating the angular orientation of the scarf cut in relation to the mid-circumferential plane of the seal.

FIG. 4 illustrates the present valve piston, indicated generally at 110, showing the structural features thereof in further detail. The valve piston 110 provides structures and features comprising an expandable sealing means including, but not limited to, the following structures. Valve piston 110 includes a primary control land 115 wherein an annular seal groove 108 is formed to a sufficient depth to receive the expandable seal 102 (FIGS. 3A–3B). The seal 102 is generally rectangular in cross-section being scarf cut (i.e. cut at an oblique angle to the mid-circumferential plane) as at 125 shown in FIGS. 5A and 5B to facilitate its radial expansion during operation. The optional expander spring 105 serves to support the seal 102 in a static (i.e. release) condition to minimize ATF leakage from the TCC apply circuit.

In addition, the valve piston 110 is provided with an internal ATF gallery to lubricate and expand the seal 102 including an axial ATF passage 112 formed along the longitudinal axis -A- to a predetermined depth and communicating with at least one radial passage 114, which is disposed in fluid communication with the seal groove 108. During the apply cycle TCC signal pressure enters the passage 112 as shown by directional arrow 370, flows through passage 114, and into seal groove 108 to urge the seal 102 in a radially outward direction thereby expanding seal 102 into contact with the bore 325 (FIGS. 3A and 3B) thereby preventing fluid pressure loss during the TCC apply cycle.

As most clearly shown in FIG. 4, a coaxial relief diameter 116 integrally connects primary control land 115 to a first intermediate control land 118, which regulates ATF flow to the apply circuit 330 (FIGS. 3A–3B). A coaxial relief diameter 120 integrally connects land 118 to a second intermediate control land 122, which regulates ATF flow to the release circuit 350. A coaxial relief diameter 124 integrally connects the land 122 to a secondary control land 126, which controls ATF flow from the release circuit 350 to exhaust. The secondary control land 126 has been substantially lengthened and further modified in comparison to the corresponding land 335a (FIG. 1) of the OEM valve piston 335.

More particularly, it can be seen that the secondary control land 126 of the present piston 110 has been increased in axial length as at dimension "X" (FIG. 4) to provide more than twice the land-to-bore contact area previously achieved by the corresponding land 335a of the OEM valve piston 335 (FIG. 1) while maintaining the overall length of the OEM piston. The increased axial length of secondary control land 126 is accommodated without modification of the OEM valve body 301 and is calculated based on the limits of axial travel of the piston 110 within the bore 325.

The present valve piston 110 also provides structures comprising centering means including, but not limited to, the following structures. The increased axial length of the primary control land 126 permits the machining of a plurality of annular grooves 25 about the circumference of land 126 as shown in FIG. 4. In the embodiment shown three of such grooves 25 are formed to a predetermined depth at regular intervals. Annular grooves 25 function to distribute pressure across the surface of land 126 by filling with ATF during operation. ATF retained within the grooves 25 is distributed about the adjacent outer surface of the valve piston 110 thereby centering and supporting the valve piston 110 within the bore 325 in the valve body 301. This virtually eliminates side loading (i.e. lateral movement) of the valve piston 110, which substantially reduces friction and wear. Annular grooves 25 also function to collect dirt and other contaminants in the fluid, which are subsequently flushed from the valve chamber by the flow of ATF to prevent interference with the operation of the valve assembly 100.

The present valve piston 110 also includes a counterbore 132 formed in coaxial relation to the lengthened control land 126 as shown in FIG. 4. The counterbore 132 functions as a receptacle for compression spring 336 wherein the spring is seated.

In operation when the TCC solenoid is OFF, the present TCC apply valve piston 110 is biased to the release position shown in FIG. 3A by spring force and line pressure. In this position converter feed pressure enters the torque converter clutch release circuit 350 and apply fluid flows around the valve piston 110 and into the cooler circuit 310 as shown. Alternatively, when the TCC solenoid is ON, TCC signal pressure at 365 moves the valve piston 110 against line pressure and spring force. When the valve piston 110 is actuated (i.e. stroked to the right as shown in FIG. 3B), it directs TCC regulated apply pressure at 345 into the apply circuit 330, converter feed fluid at 305 into the cooler circuit 310, and passes converter release fluid at 350 to exhaust at 360. Simultaneously, TCC signal pressure at 365 enters the ATF passages 112, 114 (FIG. 4) and flows under pressure to expand the seal 102 in a radially outward direction to provide an optimal seal with the bore 325 during the apply cycle.

In an installation procedure for the present replacement TCC Apply Valve 100, the OEM valve 300 and compression spring 336 are initially removed from the valve body 301. The OEM valve 300 is discarded, but the original spring 336 is retained. In some applications a new spring 336 having a higher spring rate may be preferable. Next, a lubricant is applied to the seal groove 108 on the replacement valve piston 110 and the optional expander spring 105 and/or the seal 102 are installed in the groove 108 such that the outer surface of the seal 102 is not raised above the surface of control land 115 (FIG. 4). Thereafter, the OEM compression spring 336 is inserted into the spring pocket 132 formed within control land 126. Next, the assembled valve 100 and spring 336 are carefully pushed into the valve bore 325 with the spring end first as seen in FIGS. 3A–3B.

It is important that the seal 102 remains fully seated in the seal groove 108 as it is pushed past the open ports in the valve body 301 during installation. Next, the TCC solenoid 315 including O-ring seal 316 and retaining clip 314 (FIG. 1) are reinstalled. Thereafter, using a small screwdriver or other suitable tool, carefully slide the replacement TCC apply valve 100 in the bore 325 to ensure that the present valve has not become jammed during installation.

It can be seen that the present invention provides a TCC apply valve that utilizes an expandable seal fabricated from TEFLON or other similar material, which is installed thereon in the primary wear area of the valve body to prevent a loss of regulated line pressure within the TCC apply circuit. The seal groove wherein the seal resides is in fluid communication with the TCC signal circuit via an internal ATF gallery formed within the apply valve piston. Thus, when the present TCC apply valve is actuated by TCC signal circuit pressure, the scarf cut seal is simultaneously expanded to seal the apply circuit to maximize ATF pressure to the torque converter clutch during the apply cycle.

Although not specifically illustrated in the drawings, it should be understood that additional equipment and structural components will be provided as necessary and that all of the components described above are arranged and supported in an appropriate fashion to form a complete and operative Torque Converter Clutch Apply Valve incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claim be construed broadly and in a manner consistent with the scope of invention.

What is claimed is:

1. A torque converter clutch apply valve for use in combination with the valve body of a transmission, said apply valve regulating application of the torque converter clutch responsive to fluid pressure in a torque converter clutch signal circuit, said apply valve comprising:
   an apply valve piston having primary and secondary control lands formed thereon, said primary control land having at least one annular seal groove formed therein, said valve piston further including an internal fluid gallery formed in fluid communication with said seal groove and with the torque converter clutch signal circuit;
   an expandable seal disposed within said seal groove such that said seal is urged radially outward by fluid pressure delivered through said internal fluid gallery from the torque converter clutch signal circuit simultaneously with the application of the torque converter clutch; and
   centering means formed on said secondary control land for maintaining said valve piston in coaxial relation to a cylindrical bore thereby preventing side-loading.

2. A torque converter clutch apply valve of claim 1 wherein said internal fluid gallery comprises a longitudinally oriented fluid passage formed in fluid communication with at least one radially oriented fluid passage extending to said seal groove.

3. A torque converter clutch apply valve of claim 2 wherein said expandable seal is rectangular in cross-section.

4. A torque converter clutch apply valve of claim 3 wherein said expandable seal is scarf cut through at an oblique angle to the mid-circumferential plane thereof to facilitate installation within said seal groove and radial expansion of said seal during the apply cycle.

5. The torque converter clutch apply valve of claim 1 wherein said centering means comprises a secondary control land having an increased axial length in comparison to an original equipment valve piston, wherein said increased axial length is calculated based on the axial travel limits of said valve piston, said valve piston having an increased surface area for contact within its mating bore in said valve body.

6. The torque converter clutch control valve assembly of claim 5 wherein said centering means further includes a plurality of annular grooves formed on said secondary control land at regular axial intervals, said annular grooves distributing transmission fluid about said secondary control land during operation maintaining said valve piston in coaxial relation to said bore.

7. The torque converter clutch control valve of claim 6 wherein said control land further includes a counterbore formed in a forward end face thereof, said counterbore functioning to receive said compression spring therein.

8. A torque converter clutch apply valve for use within the valve body of an automatic transmission, said apply valve being responsive to torque converter clutch signal pressure for application and release of the torque converter clutch, said apply valve comprising:
   an apply valve piston including a primary and secondary control lands, wherein said primary control land includes at least one annular seal groove formed therein;
   an expandable seal disposed within said seal groove; and
   seal expanding means disposed within said valve piston such that said seal is expandable responsive to torque converter clutch signal pressure during an apply cycle of said valve; and
   centering means formed on said secondary control land for maintaining said apply valve piston in coaxial relation to a cylindrical bore to prevent side-loading thereof.

9. A torque converter clutch apply valve of claim 8 wherein said seal expanding means includes an internal fluid gallery formed within said valve piston in fluid communication with said seal groove such that said seal is urged in a radially outward direction by fluid pressure delivered through said internal fluid gallery simultaneously with said apply cycle of said valve.

10. A torque converter clutch apply valve of claim 9 wherein said internal fluid gallery comprises a longitudinally oriented fluid passage formed in fluid communication with at least one radially oriented fluid passage extending to said seal groove.

11. A torque converter clutch apply valve of claim 10 wherein said seal expanding means further includes an expander spring disposed within said seal groove in coaxial relation to said seal supporting said seal in a static condition.

12. A torque converter clutch apply valve of claim 8 wherein said seal is rectangular in cross-section.

13. A torque converter clutch apply valve of claim 12 wherein said seal is scarf cut at an oblique angle to the mid-circumferential plane thereof to facilitate installation within said groove and radial expansion of said seal during application of the torque converter clutch.

14. A torque converter clutch apply valve of claim 13 wherein said seal is fabricated from polytetrafluoroethylene material.

15. An improved torque converter clutch apply valve for use in combination with the valve body of a transmission, said apply valve regulating application of the torque converter clutch responsive to fluid pressure level in the torque converter clutch signal circuit, the improvements comprising:
   an apply valve piston having at least one annular seal groove formed therein, said valve piston further including an internal fluid gallery in fluid communication with said seal groove and with the torque converter clutch signal circuit;
   an expandable seal disposed within said at least one annular seal groove such that said seal is urged radially outward by fluid pressure delivered through said internal fluid gallery from the torque converter clutch signal circuit simultaneously with the application of the torque converter clutch; and
   valve centering means formed on said apply valve piston for maintaining said valve piston in concentric relation to a mating cylindrical bore to prevent side-loading thereof.

16. An improved torque converter clutch apply valve of claim 15 wherein said internal fluid gallery comprises a longitudinally oriented fluid passage formed in fluid communication with at least one radially oriented fluid passage extending to said seal groove.

17. An improved torque converter clutch apply valve of claim 15 wherein said expandable seal is fabricated from polytetrafluoroethylene material.

18. An improved torque converter clutch apply valve of claim 17 wherein said expandable seal is rectangular in cross-section, said seal being scarf cut at an oblique angle to the mid-circumferential plane thereof to facilitate installation within said seal groove and radial expansion of said seal during the apply cycle.

* * * * *